Figure 1:
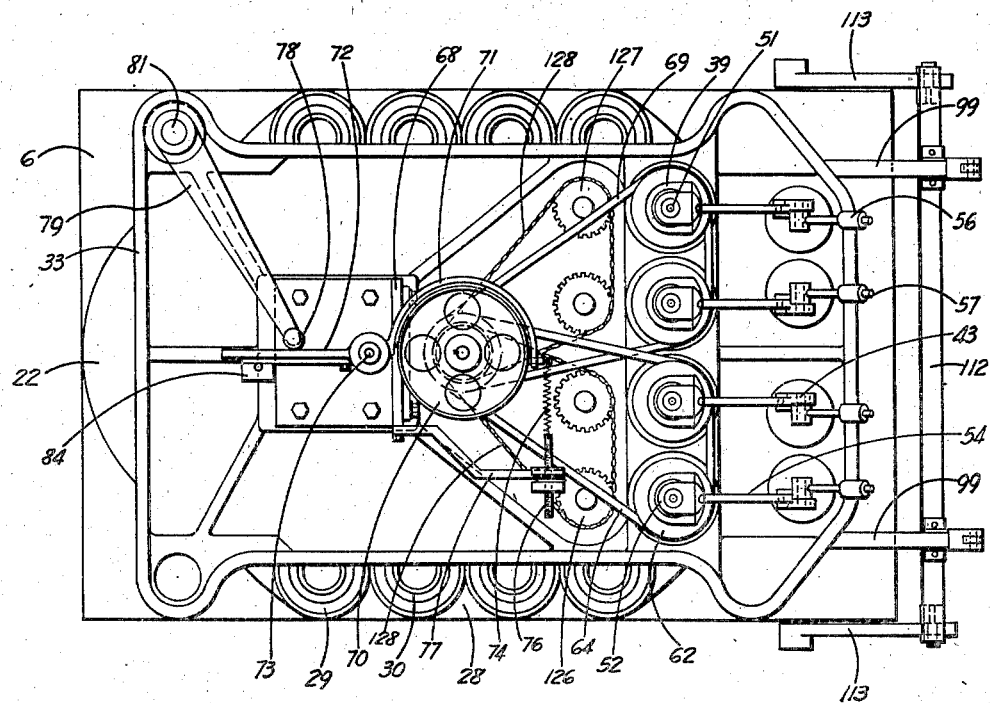

Dec. 7, 1948.  W. H. EMERSON  2,455,744
CUP FINISHING APPARATUS
Filed June 21, 1947  6 Sheets-Sheet 1

WITNESSES:
V. A. Peckham
E. O. Johns

INVENTOR
Walter H. Emerson
BY
Brown, Critchlow, Flick & Peckham
his ATTORNEYS

Dec. 7, 1948.  W. H. EMERSON  2,455,744
CUP FINISHING APPARATUS
Filed June 21, 1947  6 Sheets-Sheet 2

Dec. 7, 1948.  W. H. EMERSON  2,455,744
CUP FINISHING APPARATUS
Filed June 21, 1947  6 Sheets-Sheet 3

WITNESSES:
V. A. Peckham
E. O. Johns

INVENTOR
Walter H. Emerson
BY
Brown, Critchlow, Flick & Peckham
his ATTORNEYS.

Dec. 7, 1948.  W. H. EMERSON  2,455,744
CUP FINISHING APPARATUS
Filed June 21, 1947  6 Sheets-Sheet 4

WITNESSES
V. A. Peckham
E. O. Johns

INVENTOR
Walter H. Emerson
BY
Brown, Critchlow, Flick & Peckham
his ATTORNEYS

Dec. 7, 1948.  W. H. EMERSON  2,455,744
CUP FINISHING APPARATUS
Filed June 21, 1947  6 Sheets-Sheet 5

Inventor
Walter H. Emerson
By Brown, Critchlow, Flick & Peckham
his Attorneys

Dec. 7, 1948.  W. H. EMERSON  2,455,744
CUP FINISHING APPARATUS
Filed June 21, 1947  6 Sheets-Sheet 6

INVENTOR.
Walter H. Emerson
BY
Brown, Critchlow, Flick & Peckham
his Attorneys.

Patented Dec. 7, 1948

2,455,744

UNITED STATES PATENT OFFICE 2,455,744

CUP FINISHING APPARATUS

Walter H. Emerson, East Liverpool, Ohio, assignor to The Homer Laughlin China Company, Newell, W. Va., a corporation of Delaware Application June 21, 1947, Serial No. 756,257

24 Claims. (Cl. 25—22)

This invention relates to apparatus for finishing partially dried clay cups, such as trimming and shaping their upper edges, turning feet on them, and burnishing them.

In the manufacture of china and semi-vitreous dinnerware cups from plastic clay, the first step is to shape them by jiggering balls of clay in plaster molds. In order to be able to remove the cups from the molds when they have dried enough to become leather hard or self-supporting, the lower ends of the mold cavities should be tapered and must not be provided with annular grooves that would lock the cups in the molds. This means that feet can not be formed on the cups by the molds. The tops of such cups are not rounded and smooth when removed from the molds, and the cups are not all the same height. Also, the outer surfaces of the cups which were in contact with the molds are not as smooth as desired. Therefore, the partially dried cups are placed on a rotating chuck and the top of the cup is trimmed to shape it. This is called "topping" the cups. A groove is cut around the bottom of the rotating cup to form or turn a foot, and then the outside of the cup is burnished by another tool. These operations generally are performed by hand at considerable expense and with non-uniform results. However, in my Patent No. 2,374,339 a machine for finishing cups automatically is shown. That machine is a great improvement over the manual system, but I since have invented another machine which I believe has many advantages over my patented machine.

It is among the objects of this invention to provide apparatus which can automatically top, turn, and burnish cups with a single tool; which finishes all cups uniformly; which can be operated by unskilled labor; which finishes several cups simultaneously; which is relatively simple in construction; and which materially reduces the cost of finishing cups.

In accordance with this invention, means is provided for supporting a partially dried clay cup in upright or normal position. This supporting means is raised periodically the same predetermined distance in order to fit successive cups over a chuck rotatable on a vertical axis. The chuck, with a cup on it, is rotated, and a finishing tool beside the chuck is moved into contact with the rotating cup. This tool tops the cup, turns a foot on its bottom, and burnishes the outside of the cup. As an alternative, the burnishing can be done with a roller. As soon as this finishing operation is completed, the cup is stripped from the chuck, preferably by a weight inside the chuck.

The finished cup is lowered away from the chuck by the same means that raises the cup up to the chuck. The chuck rotates only while the cup is mounted on it. As the cup supporting means always rises to the same level, all of the cups are cut down to the same height by the topping portion of the finishing tool. For best results the chuck is movable vertically so that it will yield and not damage cups of smaller diameter into which it cannot fit as far as into larger cups. The movement of the tool preferably is controlled in such a way that after it engages the side of the cup it is rocked downwardly to turn the cup foot, and then is rocked upwardly on the cup so that the upper end of the tool will top the cup. The tool is then rocked part way down the cup again before it is removed from the cup.

For rapid operation a plurality of chucks and tools are mounted side by side, and an indexing table is mounted below them. This table is provided with groups of vertical openings corresponding in number and position to the chucks. At a loading station cups are placed in the table openings and then the table is indexed to bring the cups directly below the chucks. A number of cup-supporting members below the table then are elevated to lift the cups from the table and to raise them up to the chucks where they are held during the finishing operation. The cup-supporting members then lower the finished cups to the underlying table openings, and the table is indexed to move the finished cups to an unloading station while simultaneously moving another group of unfinished cups into position below the chucks.

Figure 2:
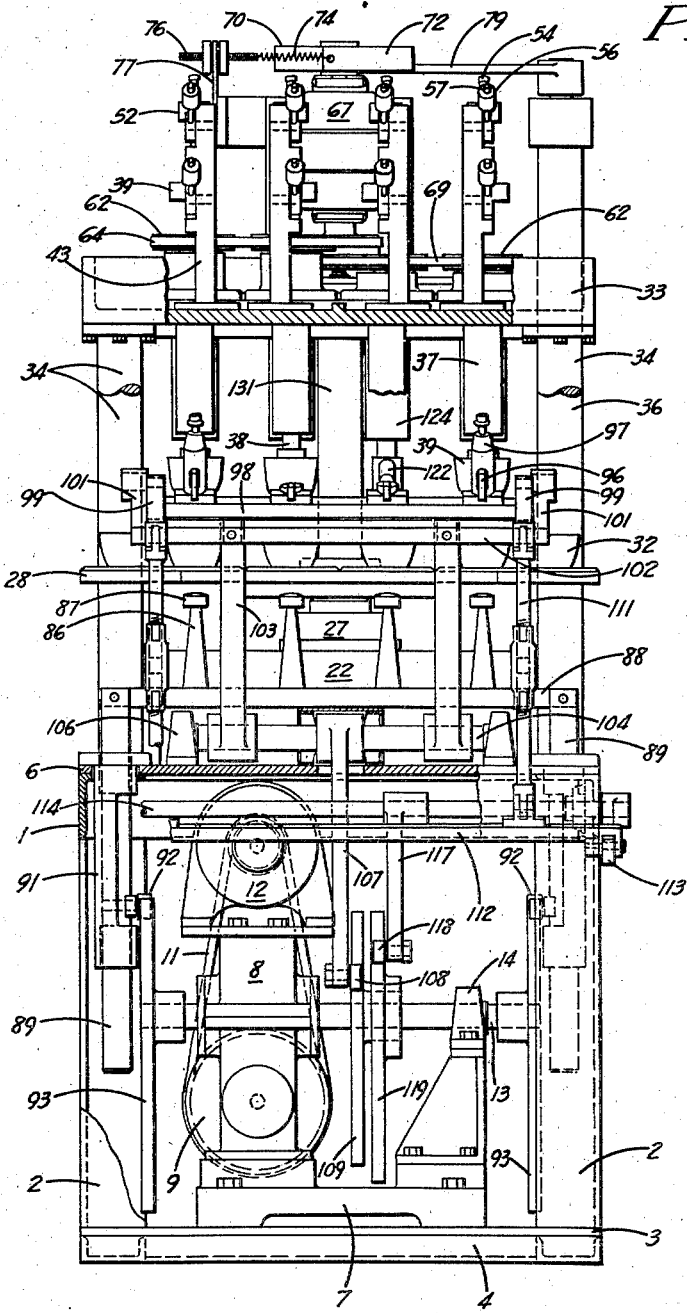
Figure 3:
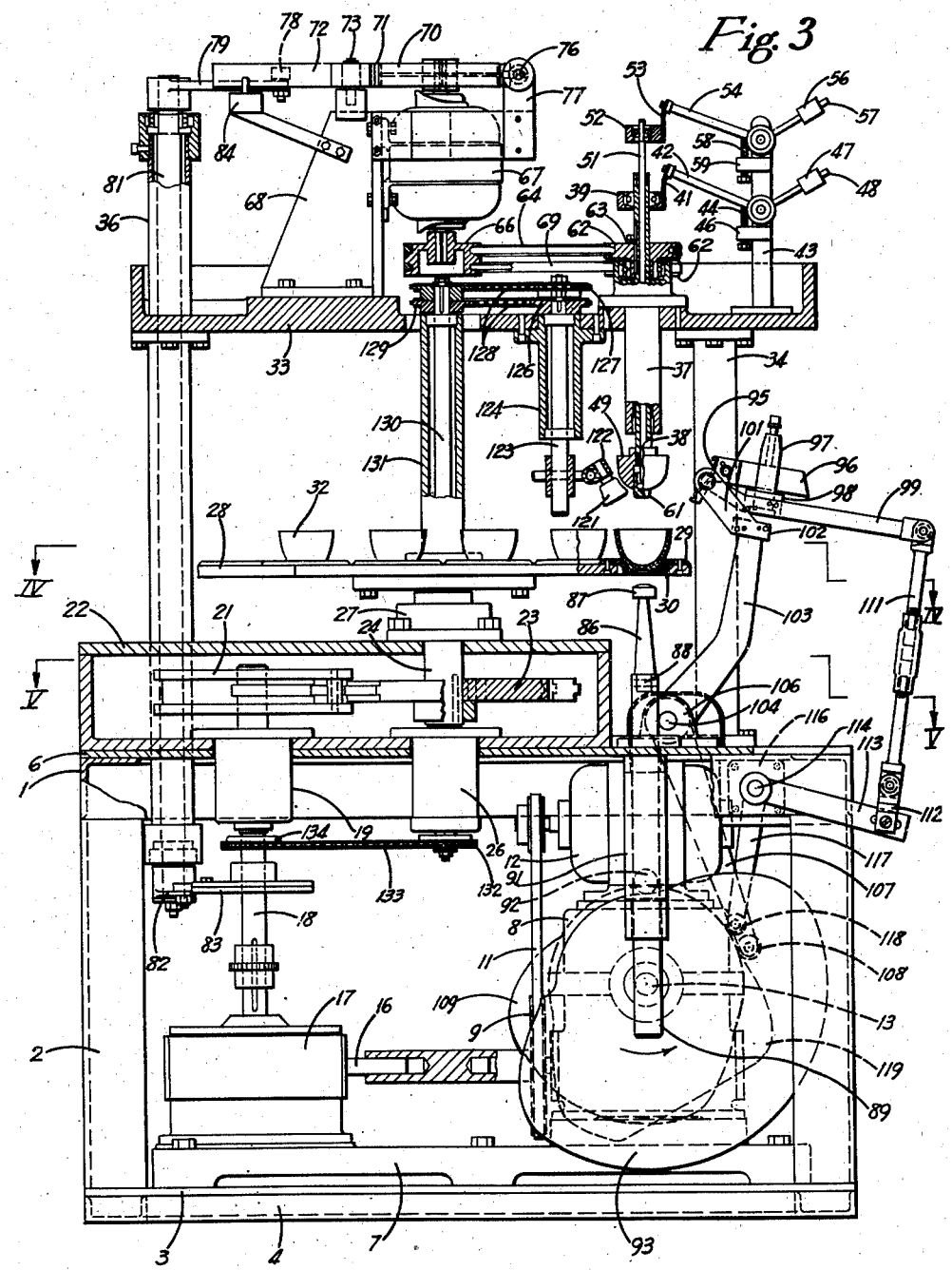
Figure 4:
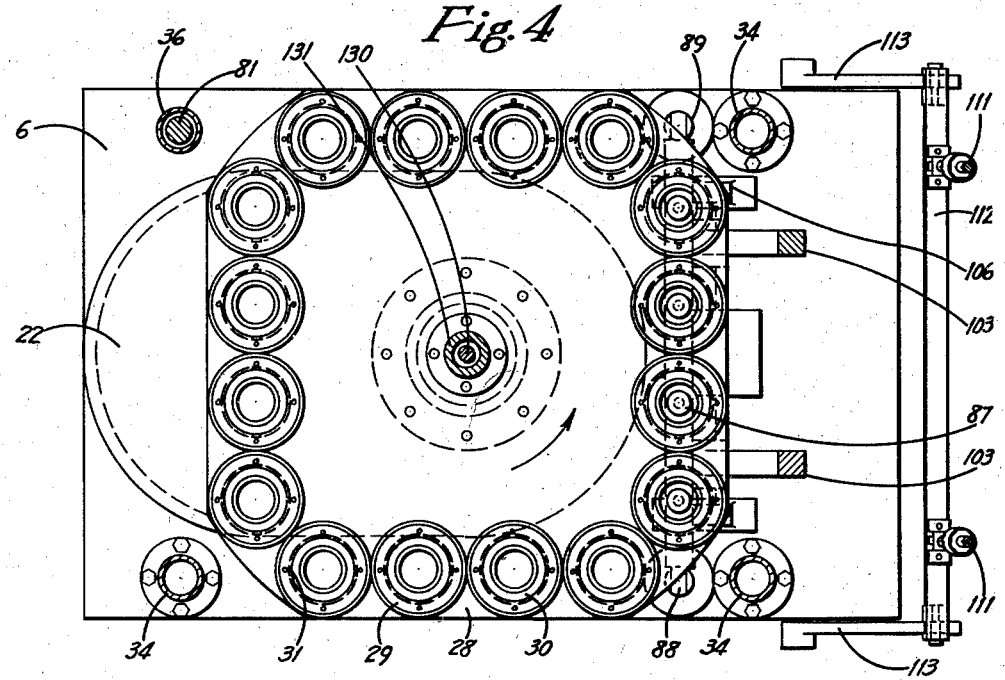
Figure 5:
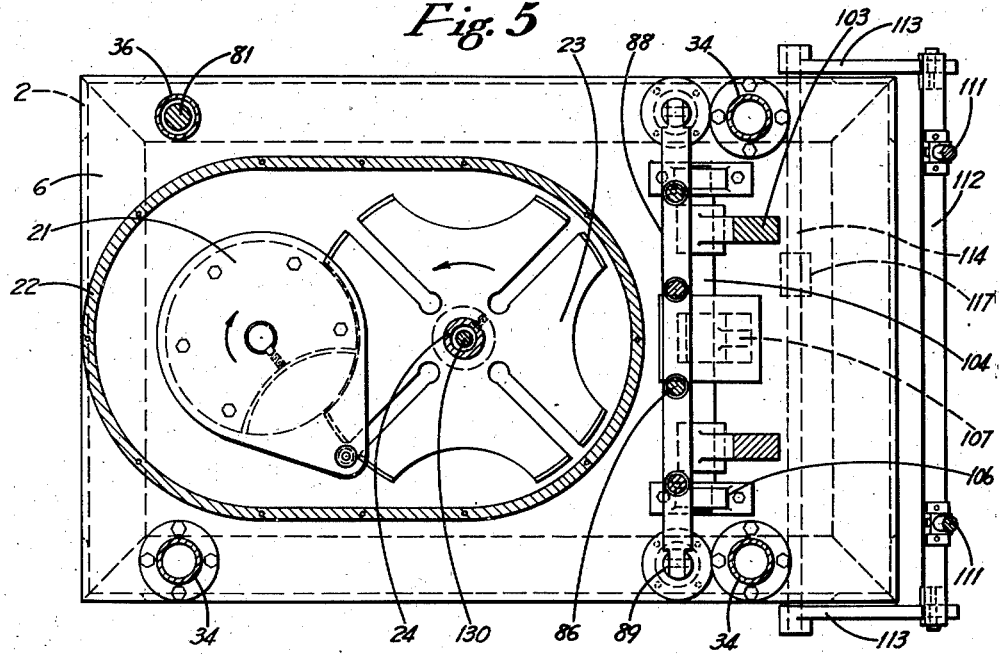
Figure 6:
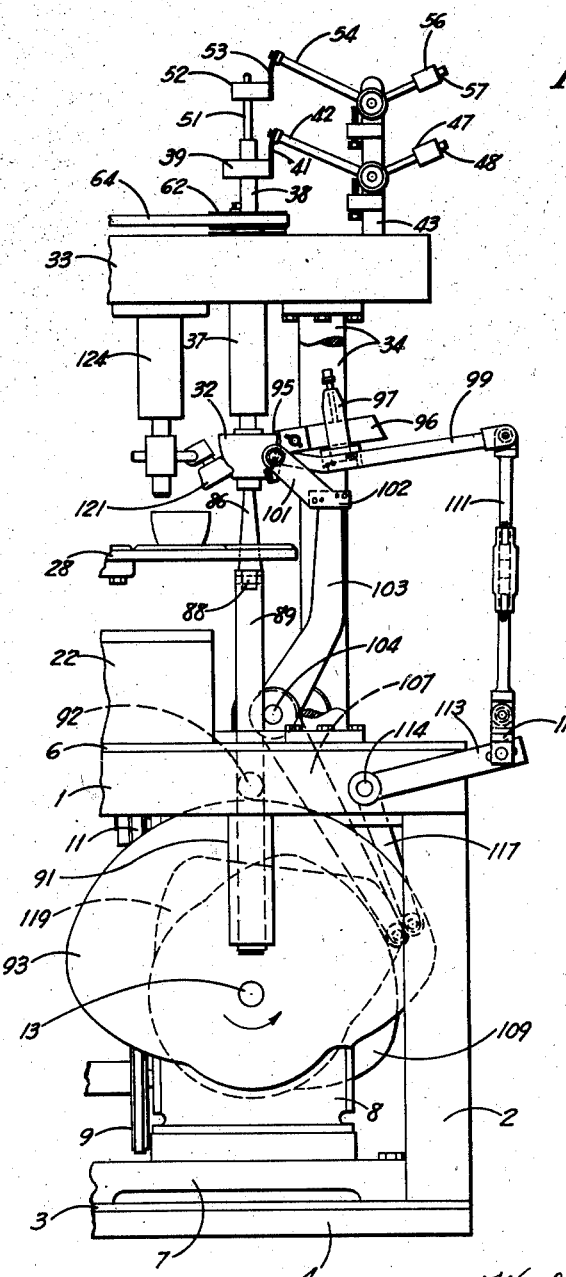

The preferred embodiment of this invention is illustrated in the accompanying drawings in which Fig. 1 is a plan view of the machine; Fig. 2 is a front end view with some parts broken away; Fig. 3 is a side view with parts shown in section; Figs. 4 and 5 are horizontal sections taken on the lines IV—IV and V—V, respectively, of Fig. 3; Fig. 6 is a fragmentary side view, similar to Fig. 3, showing cups being finished; and Figs. 7, 8, 9, and 10 are enlarged views of a cup with the tool shown in four successive positions.

Referring to the drawings, a rectangular frame is formed from horizontal angle irons 1 supported by legs 2 which rest on a bottom plate 3 supported by horizontal channels 4. The top of the frame is covered by a metal plate 6, and the sides and ends of the frame likewise may be covered by plates which are omitted in the drawings for the sake of clearness. Mounted on bottom plate 3 of the frame is a heavy base member 7 on one front corner of which a speed reducing unit 8 is mounted. The input shaft of this unit carries a pulley 9 that is driven by a belt 11 from an electric motor 12 mounted on top of the speed reducer. The slowly rotating output shaft 13 of the reducer extends through it above the input shaft and at right angles thereto. This shaft is supported at the opposite side of base member 7 by means of a pedestal bearing 14 mounted on the base, as shown in Fig. 2. The central portion and the ends of this shaft carry a number of cams that will be described later.

Operatively coupled to pulley 9 is a shaft 16 which drives another speed reducing unit 17 mounted on the back portion of the base member, as shown in Fig. 3. The output shaft 18 of this unit extends upwardly and through a bearing 19 mounted in top plate 6 of the frame. The upper end of this shaft supports the continuously rotating rotor 21 of a Geneva drive mechanism located in a housing 22 mounted on plate 6. The rotor periodically engages and turns a Geneva spider 23 which is keyed to a hollow vertical shaft 24 journaled at its lower end in a bearing 26 in the top of the frame, and also journaled in a bearing 27 mounted on housing 22.

Rigidly mounted on the central portion of the hollow shaft is an indexing table 28, preferably square with rounded corners. Each of the four sides of this table is provided with several, preferably four, vertical openings arranged in a straight line and encircled by collars 29 screwed to the top of the table. The inner edges of these collars are undercut for receiving radial tongues projecting from rings 30 that fit inside the collars. The rings can be removed and replaced by rings of other sizes by first rotating them until their tongues register with notches 31 (Fig. 4) in the collars. These rings are provided with downwardly tapered central portions for receiving partially dried (leatherhard) and unfinished cups 32. The size and shape ring used depends upon the size and shape of the cups to be finished.

Supported above the machine frame by four tubular posts is a top casting 33. Three of the posts 34 are the same height and extend only from the top of the frame to the bottom of the casting, but the fourth post 36 is longer and extends down into the frame and also above the casting for a purpose that will appear presently. The casting is provided near its front end with a line of vertical openings directly above the line of rings 30 in the side of the table which is nearest the front of the frame at the time. Extending down through these openings are flanged vertical sleeves 37 which are supported by the casting and in each of which there is a hollow spindle 38. Each spindle is supported by a bearing 39 encircling its upper end and connected by a flexible metal strip 41 to the rear end of an arm 42, the front end of which is pivotally connected to one of several small posts 43 mounted on the casting. Downward movement of this arm is limited by an adjustable screw 44 extending up through a lateral projection 46 on the post. The spindle is substantially counterbalanced by a weight 47 adjustably mounted on a rod 48 projecting forward from the front end of the pivoted arm 42. The lower end of the spindle carries a hollow chuck 49 which is shaped to fit inside of a cup that is being finished.

Slidably mounted in the spindle is a rod 51, the upper end of which is supported by a bearing 52 connected by a flexible metal strip 53 to an arm 54 pivotally mounted on the upper end of the post 43. A counterweight 56 is mounted adjustably on a rod 57 connected to this arm. Downward movement of the vertical rod 51 is limited by a screw 58 projecting from a lateral projection 59 on the post. The lower end of the rod carries a weight or head 61 which is slidably mounted in a recess in the chuck. When this head is raised up into the chuck, the lower end of the head conforms to the shape of the bottom of the chuck and forms part of its surface. When both head 61 and chuck are in their lowest positions, the head projects from the bottom of the chuck as shown in Fig. 3.

Each spindle 38 is rotated by means of a pulley 62 splined thereon at the upper end of the adjoining sleeve 37 by means of a key 63 so that the spindle can move up and down in the pulley. Two of these pulleys are driven by a belt 64 from the upper groove of a double pulley 66 which is driven by an electric motor 67 mounted on the side of a bracket 68 supported by the casting. The other two pulleys 62 are at a different level and are driven by a belt 69 from the lower groove of the double pulley. The upper end of the motor shaft carries a brake drum 70 which normally is engaged by a shoe 71 mounted in the semicircular end of a lever 72, the central portion of which is pivotally connected to the top of the motor bracket by a pin 73. The front end of this lever is connected by a coil spring 74 to a screw 76 adjustably mounted in an arm 77 connected to one side of the motor bracket.

One side of the straight rear portion of lever 72 is engaged by a roller 78 on the free end of an arm 79. The opposite end of the arm is rigidly mounted on the upper end of a rock shaft 81 extending through hollow post 36 in which it is oscillatable. The lower end of the rock shaft carries another arm 82, the free end of which periodically is engaged by a laterally adjustable cam 83 rigidly mounted on the vertical shaft 18 of speed reducer 17. When this continuously rotating cam engages the lower arm 82, the arm rocks shaft 81 and thereby causes the upper arm 79 to swing lever 72 and move the brake shoe out of engagement with brake drum 69 on the motor. This movement of the lever opens an electric switch 84 that turns on the motor. When the lever is moved back to its original position by means of spring 74, the switch snaps off and the brake shoe engages the drum and stops the motor. The off and on periods of the motor are related to the movements of cup finishing tools, as will be described presently.

As soon as table 28 comes to rest after indexing a row of cups 32 into position beneath the chucks 49, the cups are lifted from the table and pressed onto the chucks. This is accomplished by means of a row of vertically reciprocable pins 86 disposed below the table in axial alignment with the chucks. Rotatably mounted on the upper end of each pin is a head 87 having a convex upper surface adapted to seat against the bottom of a cup supported above it by the table. The lower ends of the pins are mounted in a beam 88 extending across the machine with its ends supported by the upper ends of a pair of posts 89. These posts are slidable vertically in tubular guides 91 extending down through plate 6 into the frame. A central portion of each guide is cut away to provide a slot in which a roller 92 is attached to the side of the post. The rollers connected to the two posts rest on cams 93 rigidly mounted on the opposite ends of shaft 13. As the cams rotate, they move the rollers and the posts supported thereby up and down. The rising pins 86 lift a row of cups from the table and raise them into engagement first with stripper heads 61 and then with the chucks into which the heads are pushed by the cups. If a cup happens to be under size, it will not be forced too tightly onto a chuck because the chuck will push its supporting spindle 38 up in sleeve 37.

By the time the cups are fitted over the chucks, cam 83 on vertical shaft 18 will have engaged arm 82 and, through shaft 81 and upper arm 79, swung lever 72 so that the brake on motor 67 is released and switch 84 is closed. The motor will start operating and, by means of belts 64 and 69, will rotate the chucks and the cups held on them by heads 87. While the cups are rotating, narrow finishing tools 95 are moved into and out of engagement with them for turning, topping and footing them. Each tool is adjustably mounted on one end of a support 96 which is adjustable longitudinally in a slot in a clamping member 97 secured to a cross head 98 disposed in front of the chucks. The ends of this head are supported by parallel levers 99 which extend behind and in front of the cross head. The rear ends of the levers are pivotally connected on a horizontal axis to one end of a pair of arms 101. The other ends of the arms are secured to the opposite ends of a horizontal bar 102 rigidly mounted upon the upper ends of a pair of arms 103 the lower ends of which are secured to a horizontal rocker shaft 104 journaled in bearings 106 mounted on plate 8. Secured to the central portion of this shaft is a lever 107 that extends down through an opening in the plate and carries a roller 108 on its lower end. This roller engages a cam 109, mounted on shaft 13, shaped to swing the tools 95 toward and away from the chucks while the cups are on the chucks.

While the tools are in engagement with the cups, the tools are rocked vertically to perform the several operations for which they are designed. In order to accomplish this rocking action, the front ends of the upper levers 99 are pivotally connected by links 111 to a cross bar 112, the opposite ends of which are pivotally supported by the front ends of a pair of arms 113 disposed at opposite sides of the frame. The rear ends of these arms are secured to the ends of a rock shaft 114 projecting from bearings 116 fastened to the inside of frame members 1. The central portion of this rock shaft carries a lever 117 provided at its lower end with a roller 118 which engages a cam 119 mounted on shaft 13.

Figure 7:
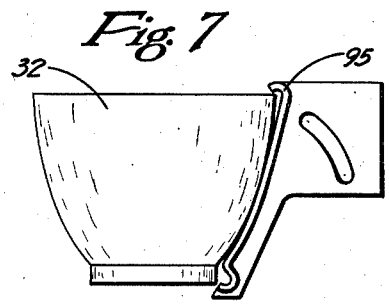
Figure 8:
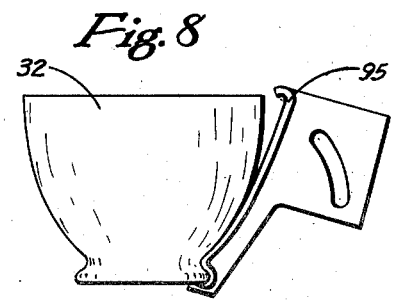
Figure 9:
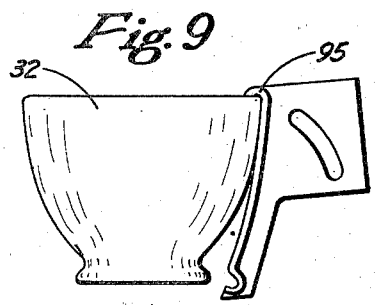
Figure 10:
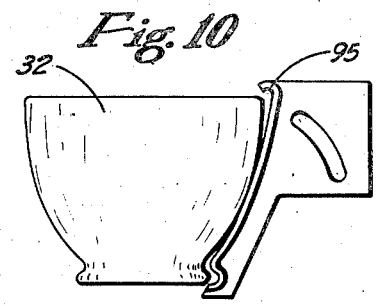

In the operation of this machine, cam shaft 13 rotates slowly and continuously and, as explained above, cams 93 first elevate posts 89 so as to cause rotatable heads 87 to lift a row of unfinished cups from table 28 and fit them over chucks 43. Motor 67 then rotates the chucks at high speed to spin the cups. In Fig. 3 cams 93 are shown at the moment that they are about to push rollers 92 upwardly. At or about the time that the cups start to spin, cam 109 swings lever 107 forward to cause arms 103 to swing tools 95 rearwardly into contact with the cups on the chucks. At the same time, cam 119 is swinging lever 117 forward to cause upper levers 99 to raise head 98 into a position wherein the tools will first engage the cups about midway between their tops and bottoms. This preferred initial engagement of tools with cups is shown in Fig. 7. While cam 109 holds the tools against the cups, cam 119 first causes the tools to be rocked downwardly to the position shown in Fig. 8 in order to form a foot on the bottom of the cup. Cam 119 then rocks the tools in the opposite direction to erase the original line of contact of tools with cups and to cause the curved upper ends of the tools to top the cups, as shown in Fig. 9, and trim all of them down to the same height. Fig. 6 shows the tools just completing the topping operation with lever 117 about to leave the high point of cam 119. When this occurs, the tools rock downwardly again to release their curved upper ends from the tops of the cups, as shown in Fig. 10, and then cam 109 permits the tools to move away from the finished cups. As soon as the tools have been retracted, arm 79 permits spring 74 to swing lever 72 so as to open electric switch 84 and to apply the brake to motor 67 in order to stop the chucks. Cam 93 then permits posts 89 to descend so that weights 61 will strip the finished cups from the stationary chucks, and heads 87 will redeposit the cups on the table. The Geneva mechanism then indexes the table 90° to move the finished cups away from the chucks and to carry a succeeding row of unfinished cups into position below the chucks. The finished cups are removed from the table and unfinished cups put in their places.

If additional burnishing of the lower portion of the cups is desired, separate burnishing members may be provided. These preferably are in the form of contoured rollers 121 rotatably mounted in brackets 122 adjustably connected to the lower ends of short shafts 123 journaled in sleeves 124 suspended from casting 33 behind sleeves 37. Keyed on the upper end of each short shaft is a sprocket 126 or 127 which is driven by one of the chains 128 from the upper or lower part of a double sprocket 129 mounted on the upper end of a long shaft 130. The upper end of this shaft is rotatably mounted in a hollow post 131 rigidly mounted on the center of the table. The inner shaft extends down through hollow table shaft 24 and bearings 27 and 26, and it carries a sprocket 132 on its lower end which is driven continuously by a chain 133 extending around a sprocket 134 mounted on shaft 18. Consequently, the short shafts 123 are slowly and continuously rotated. The burnishing rollers are so positioned that they will be carried into engagement with the spinning cups as soon as the feet have been formed on the cups. These rollers also may be used to do all of the burnishing of the lower portions of the cups, in case it is desired to use finishing tools of a shape that will not burnish those portions of the cups.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. Cup finishing apparatus comprising a cup-receiving chuck rotatable on a vertical axis, vertically movable means below the chuck adapted to support an upright partially dried clay cup, lifting means for periodically raising said cup-supporting means to fit successive cups over said chuck, a finishing tool disposed beside the chuck, driving means for rotating the chuck with a cup thereon, and actuating means for moving the tool into contact with the cup on the rotating chuck.

2. Cup finishing apparatus comprising a cup-receiving chuck rotatable on a vertical axis, vertically movable means below the chuck adapted to support an upright partially dried clay cup, lifting means for periodically raising said cup-supporting means the same predetermined distance to fit successive cups over said chuck, a finishing tool disposed beside the chuck, driving means for rotating the chuck with a cup held thereon by said supporting means, actuating means for moving the tool into contact with the cup on the rotating chuck, and stripping means for removing the finished cup from the chuck as said supporting means is lowered.

3. Cup finishing apparatus comprising a cup-receiving chuck rotatable on a vertical axis, vertically movable means below the chuck adapted to support an upright partially dried clay cup, said means having a cup-engaging portion rotatable on a vertical axis, lifting means for periodically raising said cup-supporting means the same predetermined distance to fit successive cups over said chuck and to hold them thereon, a finishing tool beside the chuck, driving means for rotating the chuck with a cup thereon, actuating means for moving the tool into contact with the cup on the chuck, and stripping means for removing the finished cup from the chuck as said supporting means is lowered, whereby the cup descends with its supporting means.

4. Cup finishing apparatus comprising a cup-receiving chuck rotatable on a vertical axis, vertically movable means below the chuck adapted to support an upright partially dried clay cup, lifting means for periodically raising said cup-supporting means the same predetermined distance to fit successive cups over said chuck, a finishing tool disposed beside the chuck, driving means for starting rotation of the chuck when a cup is placed thereon, actuating means for moving the tool into contact with the cup on the rotating chuck, and a brake for stopping rotation of the chuck before the finished cup thereon is removed.

5. Cup finishing apparatus comprising a cup-receiving chuck rotatable on a vertical axis, vertically movable means below the chuck adapted to support an upright partially dried clay cup, lifting means for periodically raising said cup-supporting means the same predetermined distance to fit successive cups over said chuck, a finishing tool disposed beside the chuck, an electric motor for rotating the chuck, an electric switch controlling the motor, means for closing said switch after a cup is placed on said chuck, actuating means for moving the tool into contact with the cup on the rotating chuck, and means for opening said switch after a cup has been finished on the chuck.

6. Cup finishing apparatus comprising a cup-receiving chuck rotatable on a vertical axis and movable vertically by pressure from below, vertically movable means below the chuck adapted to support an upright partially dried clay cup, lifting means for periodically raising said cup-supporting means the same predetermined distance to lift successive cups into engagement with the chuck, a finishing tool disposed beside the chuck, driving means for rotating the chuck with a cup thereon, and actuating means for moving the tool into contact with the cup on the rotating chuck.

7. Cup finishing apparatus comprising a cup-receiving chuck rotatable on a vertical axis and provided with a recess in its bottom, a weight movable vertically in said recess and normally projecting from it, vertically movable means below the chuck adapted to support an upright partially dried clay cup, lifting means for periodically raising said cup-supporting means the same predetermined distance to lift successive cups into engagement with said weight and chuck and thereby to move the weight up into the chuck, a finishing tool disposed beside the chuck, driving means for rotating the chuck with a cup held thereon by said supporting means, and actuating means for moving the tool into contact with the cup on the rotating chuck, said weight being adapted to strip the finished cup from the chuck as said supporting means is lowered.

8. Cup finishing apparatus comprising a rotatable and vertically movable spindle, a stop for limiting downward movement of the spindle, a cup-receiving chuck mounted on the lower end of the spindle, vertically movable means below the chuck adapted to support an upright partially dried clay cup, lifting means for periodically raising said cup-supporting means to fit successive cups over said chuck, a finishing tool disposed beside the chuck, driving means for rotating the spindle, and actuating means for moving the tool into contact with a cup on the rotating chuck.

9. Cup finishing apparatus comprising a vertical sleeve, a spindle rotatably and slidably mounted therein, a stop for limiting downward movement of the spindle in the sleeve, a rotatable member splined on the spindle at the upper end of the sleeve, driving means operatively connected to said member for rotating it periodically, a cup-receiving chuck mounted on the lower end of the spindle, vertically movable means below the chuck adapted to support an upright partially dried clay cup, lifting means for periodically raising said cup-supporting means to fit successive cups over said chuck, a finishing tool disposed beside the chuck, and actuating means for moving the tool into contact with a cup on the rotating chuck.

10. Cup finishing apparatus comprising a rotatable and vertically movable spindle, a bearing member encircling the spindle and supporting it, vertically adjustable stop means supporting said member, a cup-receiving chuck mounted on the lower end of the spindle, vertically movable means below the chuck adapted to support an upright partially dried clay cup, lifting means for periodically raising said cup-supporting means to fit successive cups over said chuck, a finishing tool disposed beside the chuck, driving means for rotating the spindle, and actuating means for moving the tool into contact with a cup on the rotating chuck.

11. Cup finishing apparatus comprising a rotatable hollow vertical spindle, driving means for rotating the spindle, a cup-receiving chuck mounted on the lower end of the spindle and provided with an axial opening, a stripper slidably mounted in said opening and spindle and normally projecting from the bottom of the chuck, said stripper also projecting above the top of the spindle, vertically movable stop means connected to the upper end of the stripper for supporting it, vertically movable means below the chuck adapted to support an upright partially dried clay cup, lifting means for periodically raising said cup-supporting means to fit successive cups over said chuck, whereby said stripper is pushed up into the chuck until said supporting means is lowered, a finishing tool disposed beside the chuck, and actuating means for moving the tool into contact with a cup on the rotating chuck.

12. Cup finishing apparatus comprising a cup-receiving chuck rotatable on a vertical axis and provided with a central vertical opening in its bottom, a stripping member slidably mounted in said opening and normally projecting from the bottom of the chuck, vertically adjustable stop means operatively connected to said member for limiting its downward movement in the chuck, vertically movable means below the chuck adapted to support an upright partially dried clay cup, lifting means for periodically raising said cup-supporting means to fit successive cups over said chuck, a finishing tool disposed beside the chuck, driving means for rotating the chuck with a cup thereon, and a tool-carrying mechanism for moving the tool into contact with the cup on the rotating chuck.

13. Cup finishing apparatus comprising a cup-receiving chuck rotatable on a vertical axis, vertically movable means below the chuck adapted to support an upright partially dried clay cup, a cam for periodically raising said cup-supporting means to fit successive cups over said chuck, a finishing tool disposed beside the chuck, driving means for rotating the chuck with a cup thereon, and actuating means for moving the tool into contact with the cup on the rotating chuck.

14. Cup finishing apparatus comprising a cup-receiving chuck rotatable on a vertical axis, vertically movable means below the chuck adapted to support an upright partially dried clay cup, lifting means for periodically raising said cup-supporting means to fit successive cups over said chuck, driving means for rotating the chuck with a cup thereon, a finishing tool disposed beside the chuck, actuating means for moving the tool into contact with the cup on the rotating chuck, and means connected to the tool for rocking it vertically against the cup to top and foot the cup.

15. Cup finishing apparatus comprising a cup-receiving chuck rotatable on a vertical axis, vertically movable means below the chuck adapted to support an upright partially dried clay cup, lifting means for periodically raising said cup-supporting means to fit successive cups over said chuck, driving means for rotating the chuck with a cup thereon, a finishing tool disposed beside the chuck, a cam for periodically moving the tool toward the chuck, and rocking mechanism operatively connected to the tool for rocking it vertically against the side of a cup on the rotating chuck to top and foot the cup.

16. Cup finishing apparatus comprising a cup-receiving chuck rotatable on a vertical axis, vertically movable means below the chuck adapted to support an upright partially dried clay cup, lifting means for periodically raising said cup-supporting means to fit successive cups over said chuck, driving means for rotating the chuck with a cup thereon, a finishing tool disposed beside the chuck, actuating means for moving the tool toward the chuck, and a cam for rocking the tool vertically against the side of a cup on the rotating chuck to top and foot the cup.

17. Cup finishing apparatus comprising a cup-receiving chuck rotatable on a vertical axis, vertically movable means below the chuck adapted to support an upright partially dried clay cup, a continuously rotating cam shaft, a cam on said shaft for periodically raising said cup-supporting means to fit successive cups over the chuck, a finishing tool disposed beside the chuck, a cam on said shaft for periodically moving the tool toward the chuck, and a cam on said shaft for rocking the tool vertically against the side of a cup on the rotating chuck to top and foot the cup.

18. Cup finishing apparatus comprising a cup-receiving chuck rotatable on a vertical axis, vertically movable means below the chuck adapted to support an upright partially dried clay cup, lifting means for periodically raising said cup-supporting means to fit successive cups over said chuck, a tool support disposed beside the chuck, a finishing tool carried by said tool support, actuating means pivotally connected on a horizontal axis to the tool support for moving said tool toward the chuck, and means for rocking said tool support on said axis to rock the tool against the side of a cup on the rotating chuck.

19. Cup finishing apparatus comprising a cup-receiving chuck rotatable on a vertical axis, a positioning member below the chuck provided with a cup-receiving recess in axial alignment with the chuck, a lifting member normally disposed below said recess and adapted to move up through it periodically to lift a cup from said positioning member and fit the cup over said chuck, driving means for rotating the chuck with a cup thereon, a finishing tool disposed beside the chuck, and actuating means for moving the tool into contact with the cup on the rotating chuck.

20. Cup finishing apparatus comprising a cup-receiving chuck rotatable on a vertical axis, a carrier below the chuck provided with a cup-receiving recess, indexing mechanism operatively connected to said carrier for indexing said recess into axial alignment with said chuck, a lifting member normally disposed below said carrier in alignment with the chuck, elevating means for periodically raising said member through said carrier recess to lift a cup from the carrier and fit it over said chuck, driving means for rotating the chuck with a cup thereon, a finishing tool disposed beside the chuck, and actuating means for moving the tool into contact with the cup on the rotating chuck.

21. Cup finishing apparatus comprising a cup-receiving chuck rotatable on a vertical axis, a table extending under the chuck and rotatable on a vertical axis located at one side of it, said table being provided with laterally spaced cup-receiving recesses, indexing mechanism operatively connected to the table for moving said recesses in succession into a position in axial alignment with the chuck, a lifting member normally disposed below the table in alignment with the chuck, elevating means for periodically raising said member through the table recess positioned below the chuck, whereby to lift a cup from the table and fit it over said chuck, driving means for rotating the chuck with a cup thereon, a finishing tool disposed beside the chuck, and actuating means for moving the tool into contact with the cup on the rotating chuck.

22. Cup finishing apparatus comprising a row of cup-receiving chucks rotatable on parallel vertical axes, a table rotatable on a vertical axis at one side of the row of chucks and extending under them, said table being provided with a plurality of rows of laterally spaced cup-receiving recesses, the recesses in each row being spaced the same distance apart as said chucks, indexing mechanism for the table for moving each row of recesses in succession into a position below the chucks wherein each recess will be in axial alignment with a chuck, a row of laterally spaced lifting members normally disposed below the table in alignment with the chucks, elevating means for periodically raising said members through the table recesses above them to lift a row of cups from the table and fit them over said chucks, driving means for rotating the chucks with cups thereon, a row of laterally spaced finishing tools disposed beside the row of chucks, and actuating means for moving said tools into contact with cups on the rotating chucks.

23. Cup finishing apparatus comprising a cup-receiving chuck rotatable on a vertical axis, vertically movable means below the chuck adapted to support an upright partially dried clay cup, lifting means for periodically raising said cup-supporting means the same predetermined distance to fit successive cups over said chuck, a finishing tool disposed beside the chuck, driving means for rotating the chuck with a cup thereon, and actuating means for moving the tool into contact with the cup on the rotating chuck.

24. Cup finishing apparatus comprising a cup-receiving chuck rotatable on a vertical axis, vertically movable means below the chuck adapted to support an upright partially dried clay cup, lifting means for periodically raising said cup-supporting means the same predetermined distance to fit successive cups over said chuck, a finishing tool disposed beside the chuck, driving means for rotating the chuck with a cup held thereon by said supporting means, and actuating means for moving the tool into contact with the cup on the rotating chuck.

WALTER H. EMERSON.

No references cited.